United States Patent [19]
Kirisawa

[11] Patent Number: 5,847,619
[45] Date of Patent: Dec. 8, 1998

[54] METHOD AND SYSTEM FOR CALIBRATING A QUADRATURE PHASE MODULATOR

[75] Inventor: Akihiro Kirisawa, Tokyo, Japan

[73] Assignee: NEC Corporation, Tokyo, Japan

[21] Appl. No.: 814,062

[22] Filed: Mar. 10, 1997

[30] Foreign Application Priority Data

Mar. 14, 1996 [JP] Japan ................................ 8-057344

[51] Int. Cl.$^6$ .................................................. H04L 27/36
[52] U.S. Cl. ........................ 332/103; 332/123; 332/159; 375/296
[58] Field of Search .................................. 332/103, 104, 332/105, 123, 159; 375/296

[56] References Cited

U.S. PATENT DOCUMENTS

| | | | |
|---|---|---|---|
| 4,717,894 | 1/1988 | Edwards et al. | 332/144 |
| 5,119,399 | 6/1992 | Santos et al. | 332/103 |
| 5,355,101 | 10/1994 | Ichihara et al. | 332/103 |
| 5,396,196 | 3/1995 | Blodgett | 332/103 |
| 5,491,832 | 2/1996 | Malkamaki et al. | 332/119 |

*Primary Examiner*—Siegfried H. Grimm
*Attorney, Agent, or Firm*—Whitham, Curtis & Whitham

[57] ABSTRACT

A calibration system for calibrating a quadrature phase modulator comprises a signal generator for generating a pair of sine-wave signals which are quadrature in phase, an adjusting section for adjusting the amplitude and phase of the pair of sine-wave signals, a DC voltage offset block for adjusting the DC level of the pair of sine-wave signals, and a frequency spectrum analyzer for monitoring the output of the quadrature phase modulator. The output spectrum of the quadrature phase modulator includes three maximal points, two of which are caused by amplitude error, phase error and carrier leakage and minimized by consecutive adjustment in the adjusting block to calibrate the quadrature phase modulator.

28 Claims, 9 Drawing Sheets

METHOD AND SYSTEM FOR CALIBRATING A QUADRATURE PHASE MODULATOR

BACKGROUND OF THE INVENTION (a) Field of the Invention

The present invention relates to a method and a system for calibrating a quadrature phase modulator and, more particularly, to a method and a system for calibrating a quadrature phase modulator for use in a radio communication, such as a satellite communication or mobile communication, to reduce phase error and amplitude error in the quadrature phase modulator.

(b) Description of the Related Art

A vector network analyzer is generally used for calibration of a quadrature phase modulator (vector modulator or I/Q modulator), as shown in FIG. 1. The quadrature phase modulator 100 comprises mixers 104 and 105, a hybrid block 106 for synthesizing the outputs of the mixers 104 and 105, a pair of phase shifters 107 and a 90° phase shifter 108 for operation of quadrature phase modulation. The calibration system constituting a modulator assembly together with the quadrature phase modulator includes a DC source 101 for supplying amplitude-adjusted quadrature signals through attenuators 102 and 103 to the quadrature phase modulator 100. A vector network analyzer 109 is generally used for receiving a local oscillation (LO) signal and a radio frequency (RF) modulated signal output from the quadrature phase modulator 100.

The vector network analyzer 109 measures the amplitude and phase of the RF modulated signal generated by modulation by the in-phase signal (I-signal) and in-quadrature phase signal (Q-signal) input to the quadrature phase modulator 100. A phase error from the exact 90° phase difference and amplitude error between the I-signal and Q-signal can be adjusted based on the measurement.

The calibration system as described above is expensive due to a high fabrication cost of the vector network analyzer. Further, the accuracy of the vector network analyzer is relatively low so that an accurate measurement cannot be obtained for the quadrature phase modulator, thereby reducing the accuracy in the calibration.

Another system for calibrating the quadrature phase modulator is proposed in Publication No. JP-A-1988-119339 (corresponding to U.S. Pat. No. 4,717,894), which is shown in FIG. 2. In this system, a vector modulation circuit for calibration is used for the quadrature phase modulator, wherein the aggregate of quadrature phase errors of a divider 201, mixers 202 and 203 and a combiner (hybrid block) 204 is minimized by using phase shifters 205 and 206. The carrier leakage is minimized by adjusting signal sources 207 and 208 to minimize the RF output when the modulation inputs are grounded. The amplitudes of the Q- and I-signals are balanced by adjusting attenuators 209 and 210 until the RF output amplitudes produced are equal. Finally, the quadrature calibration signals from DC signal sources are adjusted until the RF output amplitudes they produce are balanced. This series of adjustments is repeated until no further changes are observed.

The proposed calibration system has a variety of complicated adjustment steps which are so interrelated that convergence of the system can be obtained by repeating the above steps in sequence. Specifically, the step for adjusting the error of the I- and Q-signal amplitudes and phase error to obtain the equal RF output amplitudes requires an accuracy of the measurement to within 1 dB of error, which is difficult to attain in a usual measurement system. Further, since a quadrature phase modulator generally generates higher harmonics, the calibration system measures the high harmonic powers in addition to the fundamental harmonic power, thereby affecting the adjustment of I- and Q-signal amplitudes.

SUMMARY OF THE INVENTION

In view of the above, it is an object of the present invention to provide a method and a system for calibrating or adjusting a quadrature phase modulator with ease and accuracy.

In accordance with the present invention, there is provided a system for calibrating a quadrature phase modulator, which comprises a signal generator for generating a pair of sine-wave signals, an adjusting block for adjusting at least one of the amplitude and phase of at least one of the sine-wave signals to supply the adjusted sine-wave signals as the modulation signals to the mixers, and a spectrum analyzer for monitoring an output frequency spectrum of the hybrid block.

Further, the present invention provides a method for calibrating a quadrature phase modulator including the steps of supplying a pair of sine-wave signals and pair of carrier waves to a pair of mixers of the quadrature phase modulator, monitoring an output frequency spectrum of the quadrature phase modulator, and adjusting at least one of the amplitude and phase of at least one of the pair of sine-wave signals.

In accordance with the method and system of the present invention, an amplitude error and a phase error generated in the quadrature phase modulator can be corrected in sequence independently of each other while observing the frequency spectrum on the spectrum analyzer.

The principle of the present invention is based on the output frequency spectrum including a specific spectrum component, as follows. It is assumed that the quadrature modulation signals having a 90° phase difference therebetween are $K_m \sin \omega_m t$ and $K_m \cos \omega_m t$, respectively, and are input to an ideal four-phase phase modulator. If a carrier wave input to the four-phase phase modulator is $K_c \sin \omega_c t$, the ideal output signal u(t) obtained by the ideal four-phase phase modulator is expressed by:

$$u(t) = K_m K_c (\sin \omega_m t \cdot \sin \omega_c t + \cos \omega_m t + \cos \omega_c t)$$
$$= K_m K_c \cos(\omega_c t - \omega_m t)$$

Accordingly, the ideal output signal u(t) can be observed at a single spectrum component in a frequency spectrum on a frequency spectrum analyzer. This principle can be used for calibrating the quadrature phase modulator according to the present invention, as will be detailed later.

The above and other objects, features and advantages of the present invention will be more apparent from the following description, referring to the accompanying drawings.

DESCRIPTION OF THE PREFERRED EMBODIMENTS

Figure 1:
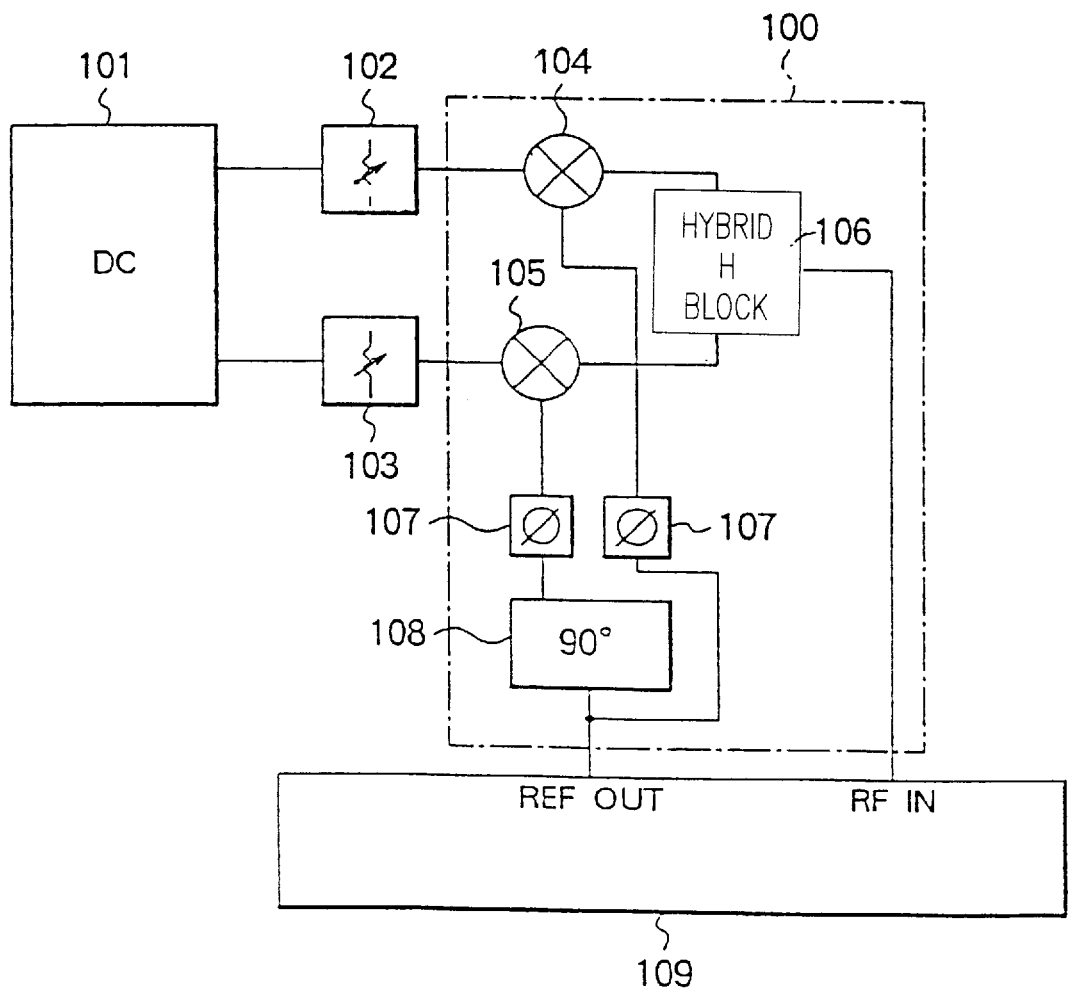
FIG. 1 is a block diagram of a conventional calibration system for a quadrature phase modulator.
Figure 2:
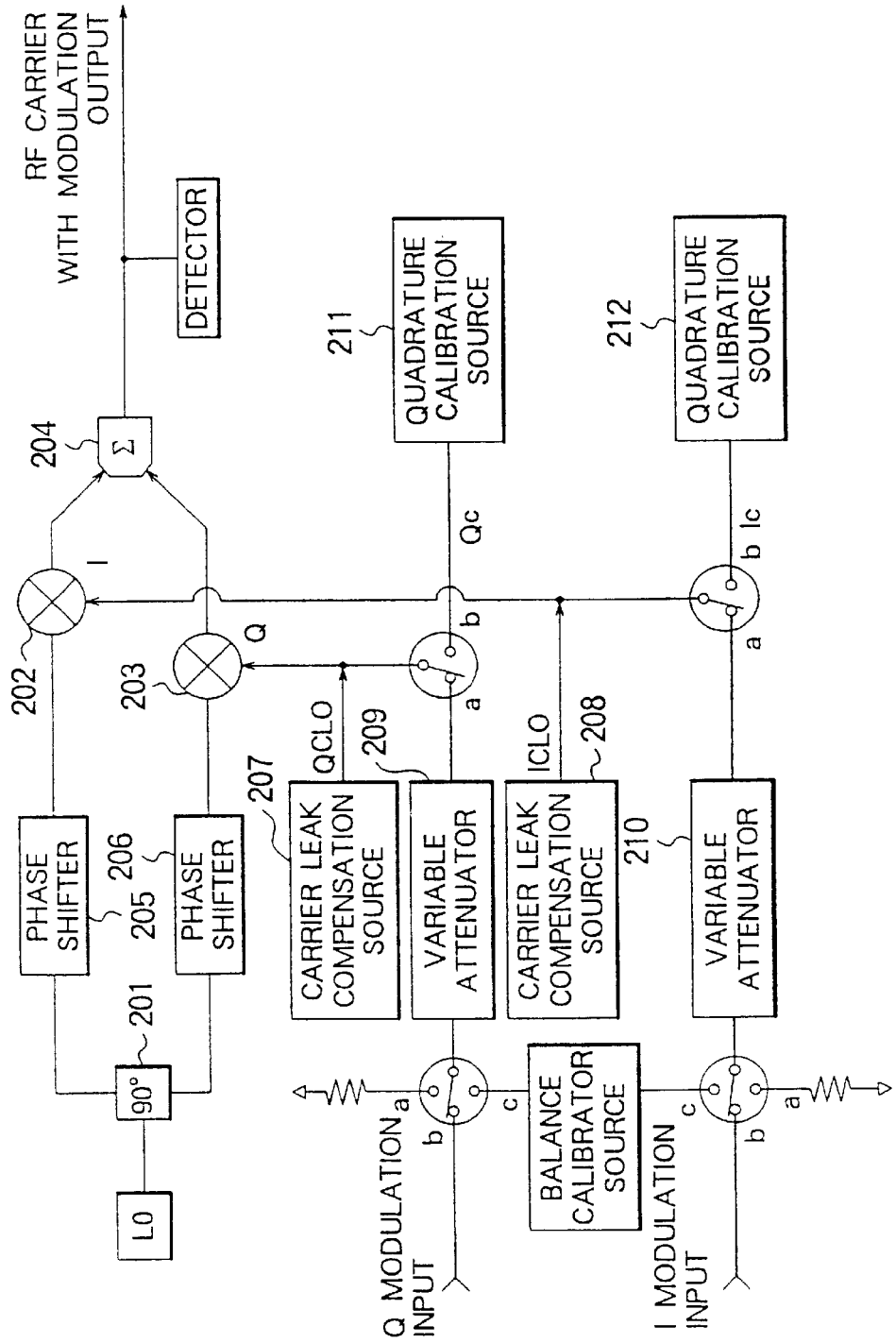
FIG. 2 is a block diagram of another calibration system proposed in a patent publication.

Now, preferred embodiments of the present invention will be described with reference to the accompanying drawings, wherein similar constituent elements are designated by the same reference numerals throughout the drawings.

Figure 3:
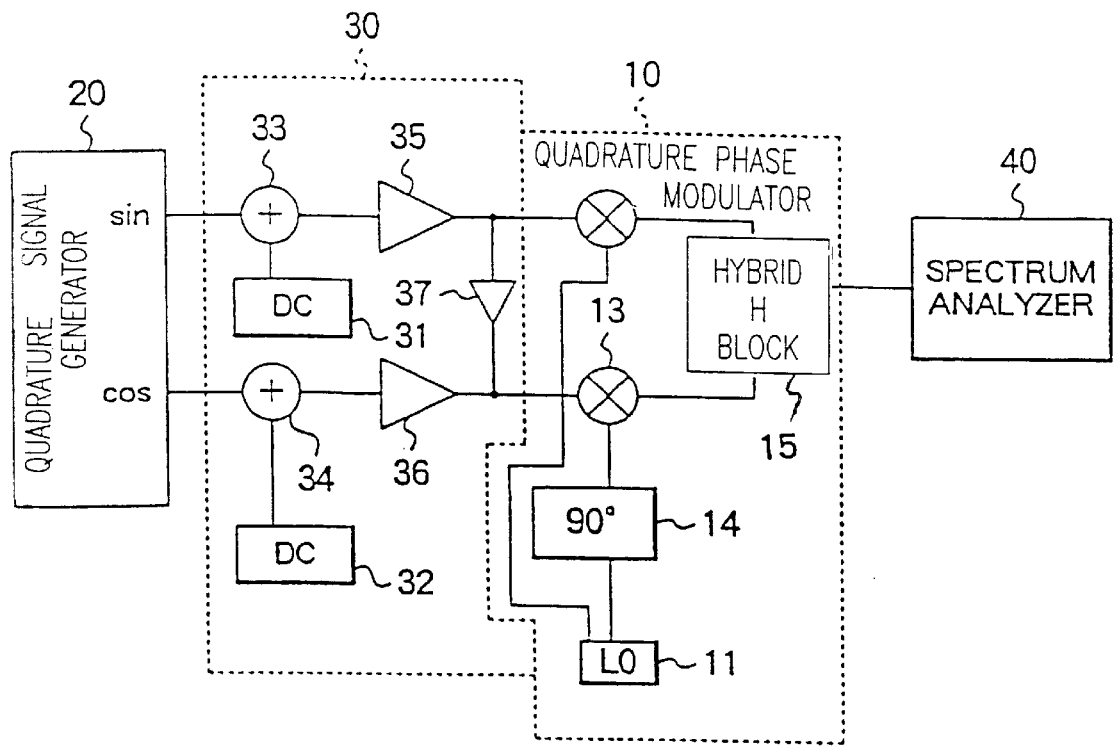
FIG. 3 is a block diagram of a calibration system for a quadrature phase modulator according to an embodiment of the present invention.

Referring to FIG. 3, a calibration system according to a first embodiment of the present invention is used for a quadrature phase modulator 10 which includes a local oscillator 11 for generating a carrier wave, a first mixer 12 for mixing I-signal with the carrier wave, a second mixer 13 for mixing Q-signal with a phase-corrected carrier wave obtained by shifting the carrier wave by 90° in phase, a 90° phase shifter 14 for phase-shifting carrier signal for the mixer 13, and a hybrid (H) block (or combiner) 15 for synthesizing the outputs of the mixers 12 and 13.

The calibration system comprises a sine-wave quadrature signal generator 20 for generating sine-wave quadrature signals having a phase difference of 90° therebetween, an adjusting block 30 integrated to the quadrature phase modulator 10 for adjusting the phase difference and amplitude difference between the sine-wave quadrature signals to supply the adjusted quadrature signals to the mixers 12 and 13 of the quadrature phase modulator 10, and a frequency spectrum analyzer for receiving the output of the quadrature phase modulator 10 to observe the frequency spectrum in the output of the quadrature phase modulator 10.

Figure 4:
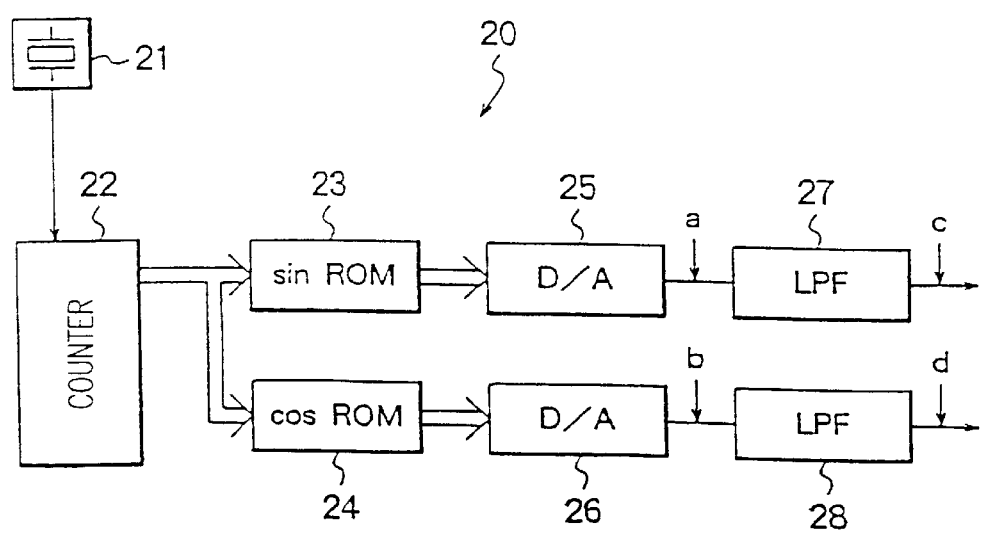
FIG. 4 is an exemplified block diagram of the quadrature signal generator shown in FIG. 3.
Figure 5A:
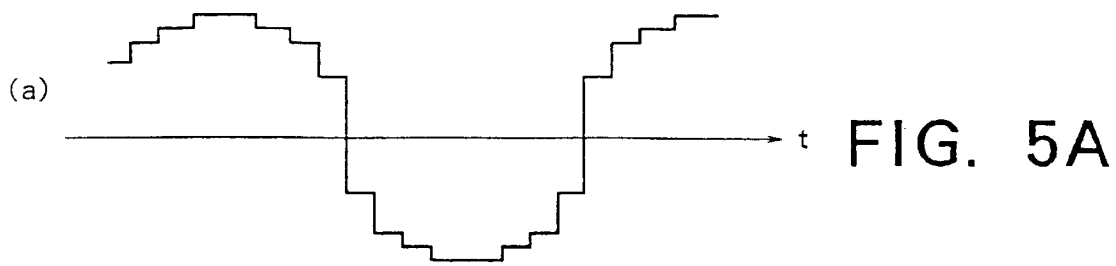
FIGS. 5A to 5D are timing charts of signals in the quadrature signal generator of FIG. 4.
Figure 5B:
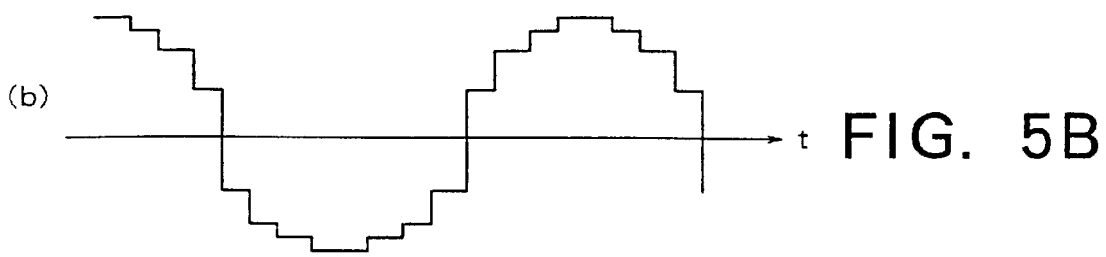
Figure 5C:
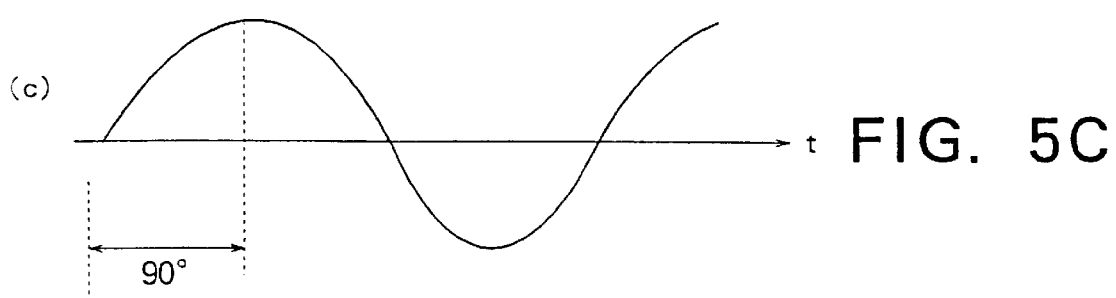
Figure 5D:
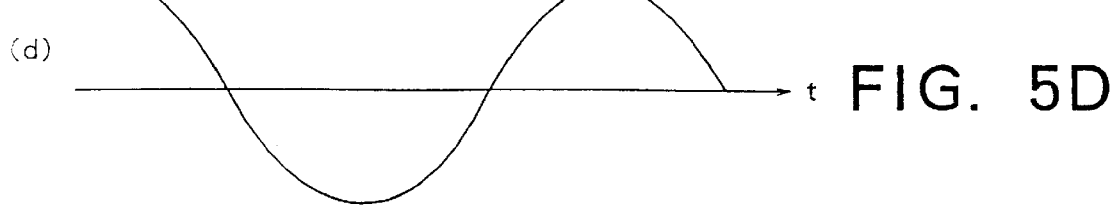

FIG. 4 shows a diagram of an example of a practical circuit for the sine-wave quadrature signal generator, which includes a clock source 21, such as implemented by a crystal oscillator, a counter 22 for counting the clocks of the clock source 21 to generate an address signal representing elapsed time, sine-ROM 23 and cosine-ROM 24 addressed by the address signal, D/A converters 25 and 26 for converting the data read out from the sine-ROM and cosine-ROM, respectively, to generate analog sine-wave signals, and low-pass filters (LPFs) 27 and 28 for passing the low frequency components of the outputs of the D/A converters 25 and 26, respectively The sine-ROM 23 and cosine-ROM 24 have data for sine signal and cosine signal, respectively, which are read by the time signal counted by the counter 22. FIGS. 5A and 5B show the data stored in and read out from the sine-ROM 23 and cosine-ROM 24, respectively, and FIGS. 5C and 5D show the outputs of the LPFs 27 and 28, respectively, which have phase difference of 90° therebetween.

The adjusting block 30 shown in FIG. 3 comprises a pair of DC offset voltage generators 31 and 32 for generating offset voltage for the sine-wave quadrature signals, a pair of adders 33 and 34 for adding the outputs of the sine-wave quadrature signal generator 20 and the outputs of the DC offset voltage generators 31 and 32, respectively, a variable-gain amplifier 35 for receiving the output of the adder 33 to generate an I-signal, a fixed-gain amplifier 36 for receiving the output of the adder 34 to generate a Q-signal, and a phase corrector 37 for correcting the phase difference between the outputs of the amplifiers 35 and 36 to supply a phase-corrected Q-signal.

Figure 6:
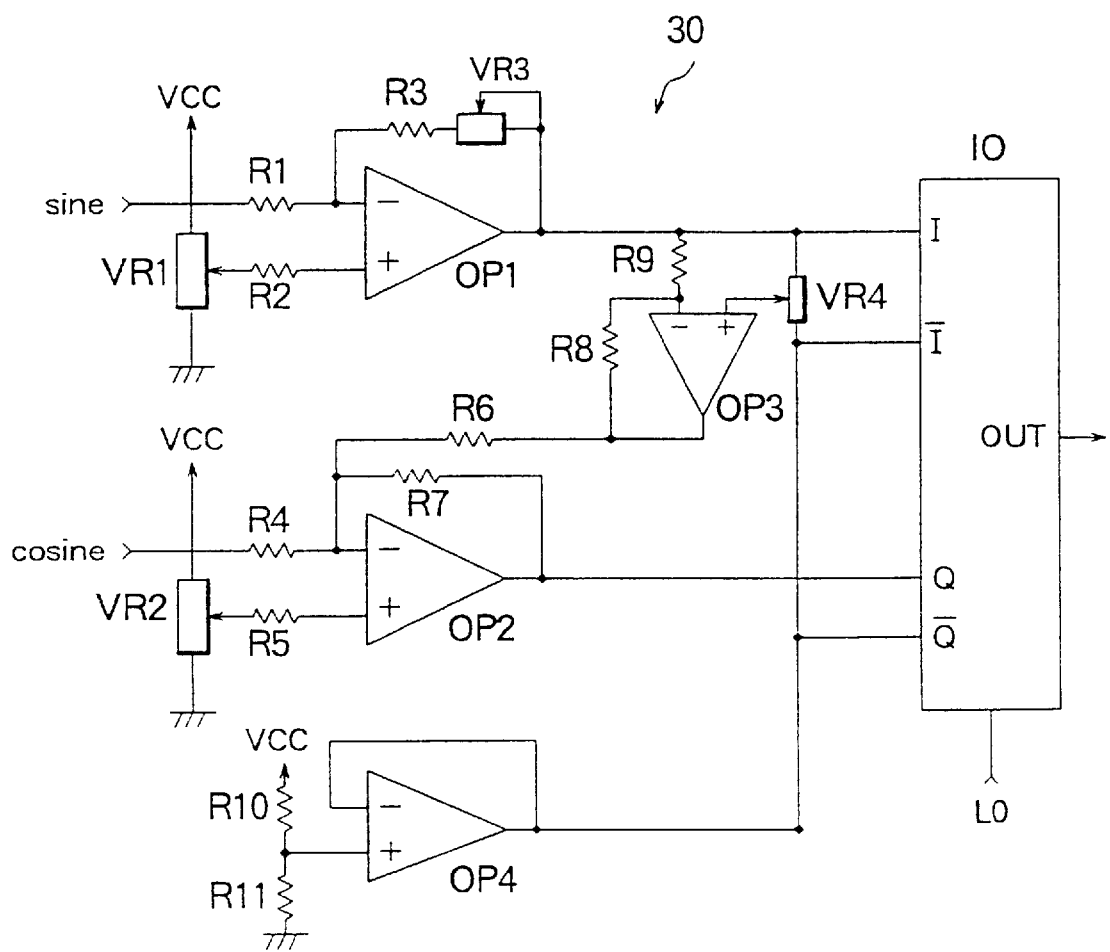
FIG. 6 is a schematic diagram of an example of the adjusting block shown in FIG. 3.

FIG. 6 shows an example of a practical circuit for the adjusting block 30 shown in FIG. 3. The adjusting block 30 includes a first operational amplifier OP1, constituting the adder 33 in FIG. 3, for receiving the sine signal at the inverting input thereof through resistor R1 and an output of a variable resistor VR1 (DC offset voltage generator 31) through resistor R2 at the non-inverting input thereof to supply the I-signal to the quadrature modulator 10. The adjusting block 30 includes a second operational amplifier OP2, constituting the adder 34 in FIG. 3, for receiving the cosine signal at the inverting input thereof through resistor R4 and an output of a variable resistor (DC offset voltage generator 32) VR2 through resistor R5. A feedback loop for the first operational amplifier OP1 includes a variable resistor VR3 for adjusting the gain of the first operational amplifier OP1, thereby constituting the variable gain amplifier 35 in FIG. 3.

A third operational amplifier OP3 constituting the phase corrector 37 generates a divided I-signal, which is obtained by adjusting a variable resistor VR4 to have a desired amplitude proportional to that of I-signal, so as to supply the divided I-signal to the non-inverting input of the second operational amplifier OP2. The second operational amplifier OP2 adds the input cosine signal and the output of the third operational amplifier OP3 to supply a phase-corrected Q-signal. The desired phase for the phase-corrected Q-signal is obtained by adjusting a variable resistor VR4. A fourth operational amplifier OP4 supplies a bias voltage to the quadrature phase modulator 10.

The calibration system shown in FIG. 3 is used for correcting the errors generated in the quadrature phase modulator 10 which modulates the carrier wave supplied from the local oscillator 11 with the I-signal and phase-corrected Q-signal. The output signal of the quadrature phase modulator 10 generally includes an amplitude error generated by a gain difference between the mixers 12 and 13 or difference in power loss between the signal paths from the inputs to the output of the hybrid block 15, and a phase error caused by the insufficiency of the hybrid block 15 or difference in phase rotation between the mixers 12 and 13. The output signal of the quadrature phase modulator further includes a carrier leakage or local leakage caused by an insufficient isolation between the local port of the mixer 12 or 13 for the carrier wave and the output port of the mixer 12 or 13 and by stray leakage.

The spectrum analyzer 40 of the calibration system displays thereon the output of the quadrature phase modulator 10 in terms of frequency spectrum. While observing the frequency spectrum analyzer 40 or monitoring the output of the quadrature phase modulator, the quadrature phase modulator is calibrated. Calibration by the calibration system of the present embodiment will be described hereinafter.

Figure 7A:
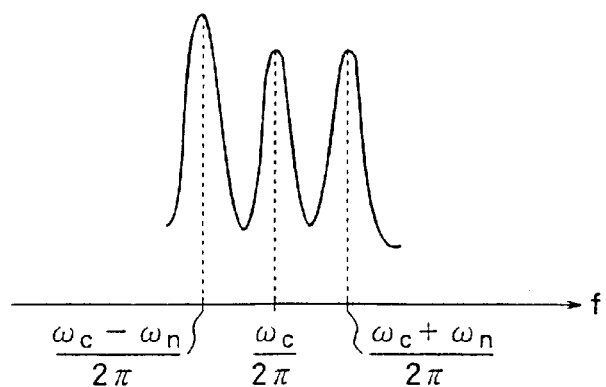
FIGS. 7A to 7C are frequency spectrum diagrams of outputs of the quadrature phase modulator shown in FIG. 3.

FIGS. 7A to 7D show different spectra which can be observed on the spectrum analyzer 40. FIG. 7A shows a frequency spectrum on the spectrum analyzer 40 before the quadrature phase modulator 10 is calibrated or when the calibration executed is insufficient for any error or carrier leakage. The frequency spectrum includes three maximal points at frequencies:

$$(\omega_c - \omega_n)/2\pi, \; \omega_c/2\pi, \; \text{and} \; (\omega_c + \omega_n)/2\pi.$$

Assuming that a local oscillation signal having a frequency $fc(=\omega_c/2\pi)$ provides outputs for the hybrid block which are $K_c \sin \omega_c t$ and $K_c \cos \omega_c t$, and that the modulation signals input to the quadrature phases modulator 10 are $K_m \sin \omega_m t$ and $K_m \cos \omega_m t$, the output u(t) of the quadrature phase modulator can be expressed by the following equation:

$$\begin{aligned} u(t) &= K_m K_c \sin \omega_m t \cdot \sin \omega_c t + K_m K_c \cos \omega_m t \cdot \cos \omega_c t \quad (1) \\ &= (1/2) \cdot K_m K_c \{\cos(\omega_c - \omega_m)t + \cos(\omega_c + \omega_m)t + \\ &\quad \cos(\omega_c - \omega_m)t - \cos(\omega_c + \omega_m)t\} \\ &= K_m K_c \cos(\omega_c - \omega_m)t. \end{aligned}$$

However, the quadrature phase modulator before calibration supplies an output signal including an amplitude error, a phase error and a local leakage so that the output u(t) is expressed by the following equation:

$$\begin{aligned} u(t) &= K_m K_c \{(1 + \alpha)\sin(\omega_m t + \beta) + \gamma_1\} \cdot \sin \omega_c t + \quad (2) \\ &\quad K_m K_c \{\cos \omega_m t + \gamma_2\} \cdot \cos \omega_c t \\ &= K_m K_c (1 + \alpha)(\gamma_1 \sin \omega_c t + \gamma_2 \cos \omega_c t) + \\ &\quad (1/2) \cdot K_m K_c (1 + \alpha) \{\cos\{(\omega_c - \omega_m)t + \beta\} + \\ &\quad (1/2) \cdot K_m K_c \cos(\omega_c - \omega_m)t + \\ &\quad (1/2) \cdot K_m K_c (1 + \alpha)\cos\{(\omega_c + \omega_m)t + \beta\} - \\ &\quad (1/2) \cdot K_m K_c \cos(\omega_c + \omega_m)t \end{aligned}$$

wherein $\alpha$, $\beta$, and $\gamma_1$ and $\gamma_2$ are a constant defined by the amplitude unbalance in the modulator, a constant defined by the phase unbalance in the modulator, and two constants defined by the local leakage, respectively. The equation (2) provides the three maximal points in the frequency spectrum observed by the spectrum analyzer 40, as shown in FIG. 7A.

Adjustment of the variable resistors VR1 and VR2 for the operational amplifiers OP1 and OP2 are executed to adjust the DC offset voltages, to thereby suppress the local leakage, whereby the first term in equation (2) approaches toward zero while the second and third terms are not affected by the adjustment. This adjustment provides the frequency spectrum as shown in FIG. 7B by suppressing the spectrum component $\omega_c/2\pi$ caused by the local leakage, independently of the other frequency spectrum component caused by other errors.

Figure 7B:
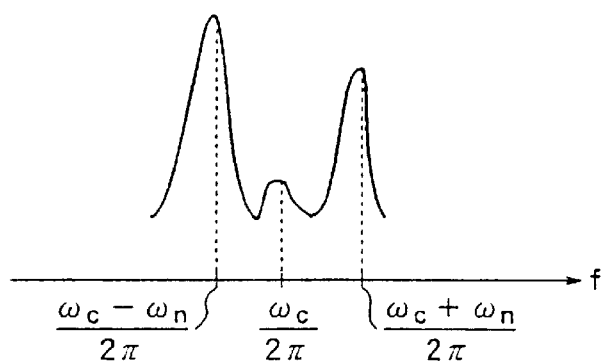
Figure 7C:
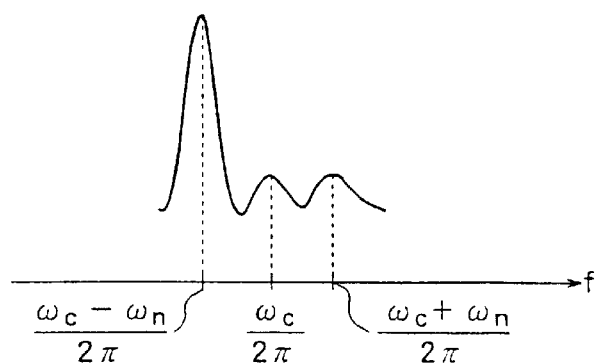
Figure 8A:
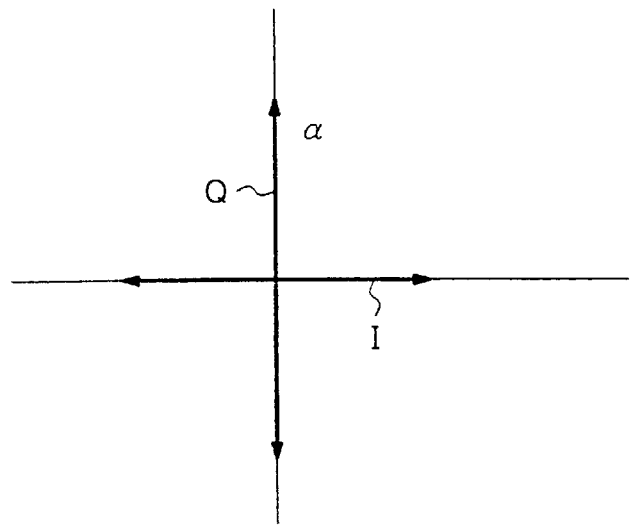
FIGS. 8A and 8B are vector diagrams for I- and Q-signals.

If only an amplitude error exists, the frequency spectrum will be such as shown in FIG. 7B. In this case, the modulation signals are shown in FIG. 8A in a vector notation, wherein I-signal and Q-signal are exactly quadrature in phase while having different amplitudes. The calibration can be executed by adjusting the variable resistor VR3 for the first operational amplifier OP1 in FIG. 6 to thereby adjust the gain of the variable-gain amplifier 35 in FIG. 3. As the second term in equation (2) approaches toward zero, the output frequency spectrum approaches to the figure shown in FIG. 7C, wherein spectrum components $\omega_c/2\pi$ and $(\omega_c - \omega_m)/2\pi$ scarcely change. While it is difficult in the conventional method to obtain an amplitude balance within 1% between the I-signal and Q-signal because of the limited accuracy of the measurement, since the vector difference between the I-signal and Q-signal in the present embodiment appears at a frequency of $(\omega c + \omega m)/2\pi$, the adjustment within 1% can be easily attained by merely adjusting the ratio D/U at 40 dB.

Figure 8B:
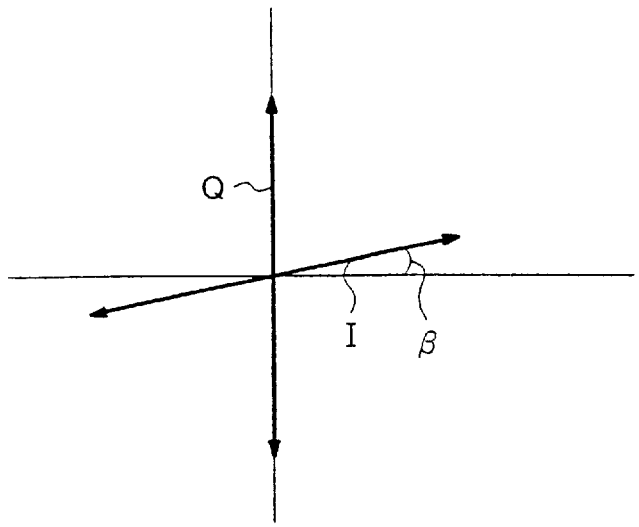

Next, a case in which only a phase error exists in the quadrature phase modulator will be discussed, wherein the I-signal and Q-signal have phase difference $\beta$ therebetween and have the same amplitude, as shown in FIG. 8B. The frequency spectrum in this case is also shown in FIG. 7B. Assuming that $\alpha=0$ and $\beta \approx 0$, the second term in equation (2) can be expressed by:

$$(1/2) \cdot K_m K_c \cos(\omega_c + \omega_m)t \cdot \cos \beta - \sin(\omega_c + \omega_m)t \cdot \sin \beta -$$

$$(1/2) \cdot K_m K_c \cos(\omega_c + \omega_m)t \approx -\beta \cdot \text{sub}(\omega_c + \omega_m)t.$$

It is noted the spectrum component $(\omega c + \omega m)/2\pi$ changes as $\beta$ changes. Similarly to the case of correcting the amplitude error, the phase adjustment can be executed to obtain an accurate phase difference within 1° of error.

Figure 9:
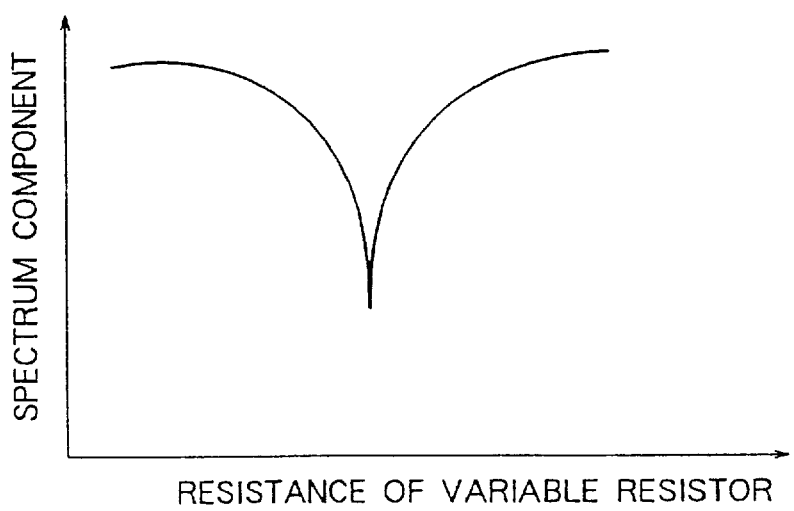
FIG. 9 is a graph showing the relationship between output frequency spectrum components of the quadrature phase modulator and resistance of a variable resistor.

As described above, the quadrature phase modulator can be calibrated by adjusting the DC offset block 31 and 32, variable-gain amplifier 35 and phase corrector 37. FIG. 9 shows a graph depicting the level of the spectrum component $(\omega_c + \omega_m)/2\pi$ or $\omega_c/2\pi$ when the corresponding variable resistor is adjusted, wherein the level of the spectrum component is reduced abruptly by adjusting the corresponding variable resistor to thereby attain an optimum point for calibration with ease.

Figure 10:
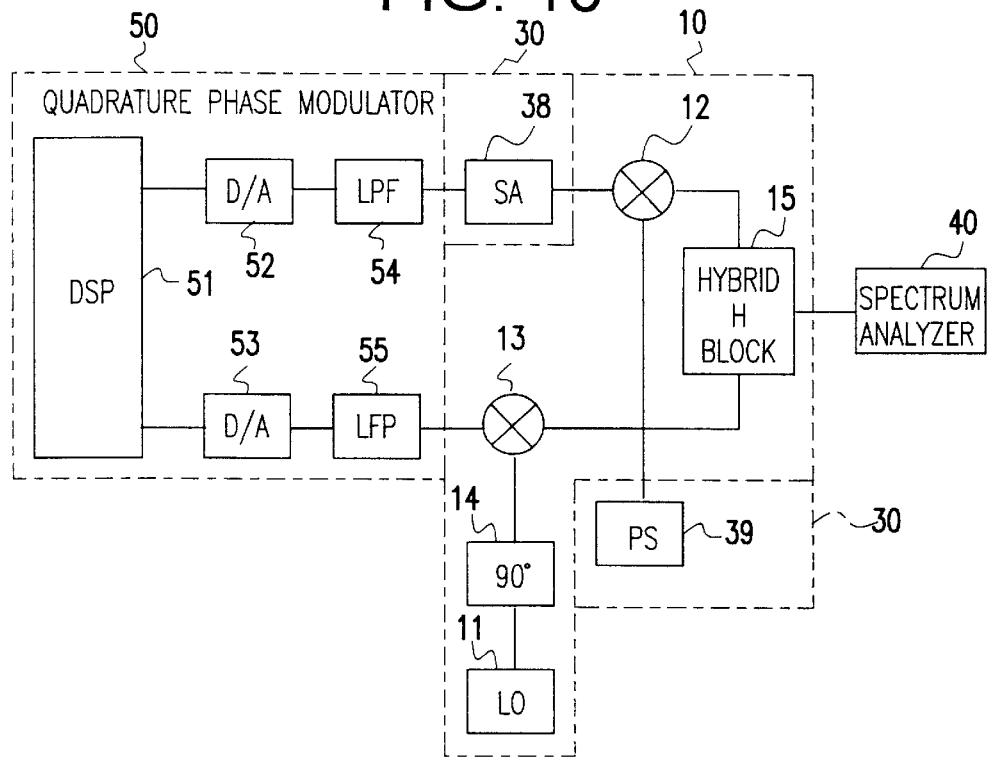
FIG. 10 is a block diagram of a calibration system for a quadrature phase modulator according to a second embodiment of the present invention.

FIG. 10 shows a calibration system according to a second embodiment of the present invention, wherein the calibration system is integrated to the quadrature phase modulator 10 to form a modulator assembly except for the spectrum analyzer 40. The calibration system comprises a sine-wave quadrature signal generator 50 including a digital signal processor (DSP) 51. The digital outputs of the DSP 51 are converted in respective D/A converters 52 and 53 and supplied to the quadrature phase modulator 10 through respective LPFs 54 and 55. The DSP 51, which is generally used for implementing the digital filter such as Nyquist filter in an operational mode of the quadrature phase modulator, thus provides sine-wave quadrature signals in the calibration mode of the quadrature phase modulator. The adjusting block 30 in the calibration system of the present embodiment includes a signal attenuator (SA) 38 on the signal line for I-signal between the LPF 54 and mixer 12, and a phase shifter 39 on the signal line for the carrier wave between the local oscillator 11 and mixer 12. Adjustment of the attenuator 38 and phase shifter (PS) 39 provides amplitude adjustment and phase adjustment, respectively, which are similar to the first embodiment.

Figure 11:
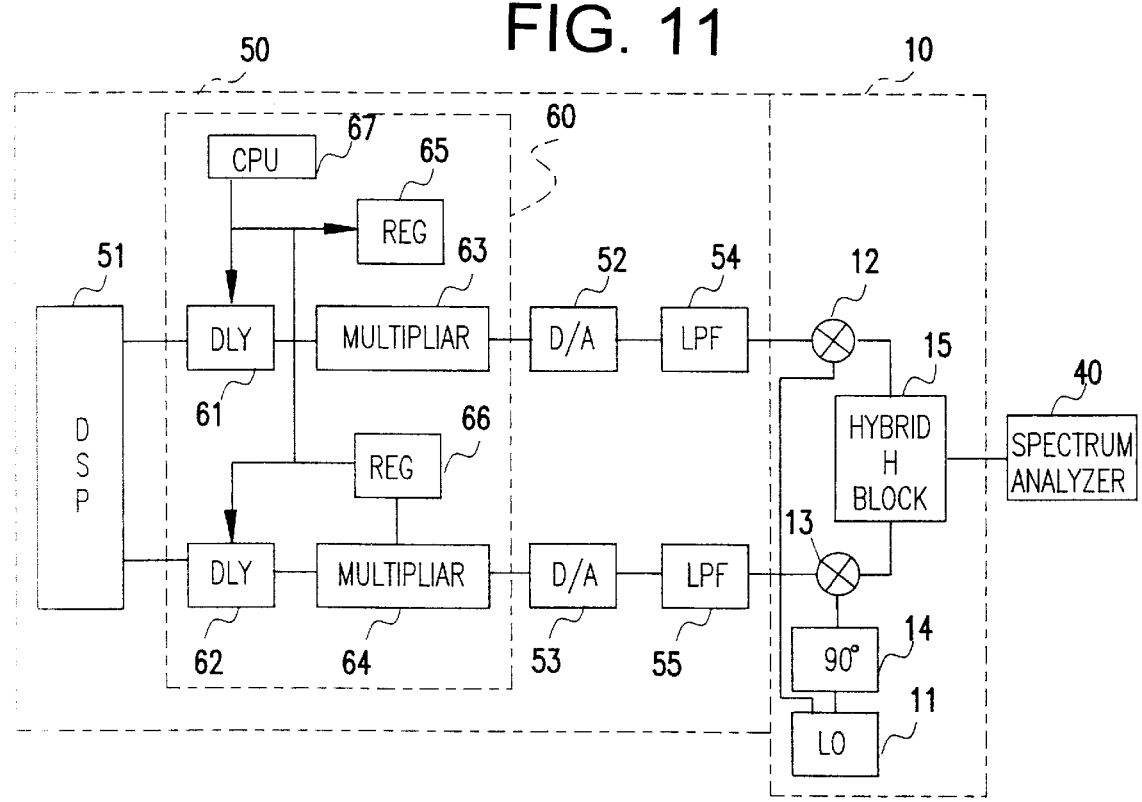
FIG. 11 is a block diagram of a calibration system for a quadrature phase modulator according to a third embodiment of the present invention.

FIG. 11 shows a calibration system according to a third embodiment of the present invention, which is integrated to a quadrature phase modulator similarly to the second embodiment. The third embodiment is similar to the second embodiment except that an adjusting block 60 is provided for calibration in the third embodiment between the outputs of the DSP 51 and the inputs of D/A converters 52 and 53 in the second embodiment. The adjusting block 60 comprises a micro processor (CPU) 67, a pair of registers 65 and 66, a pair of delay circuits 61 and 62 at the outputs of the DSP 51, a pair of multipliers (M) 63 and 64 for receiving the output of the delay circuits 61 and 62. Delays for the output of the DSP 51 are adjusted in the delay circuits 61 and 62 for adjusting the phase difference between the outputs of the DSP 51. The data supplied from the CPU 67 and stored in the registers 65 and 66 are used as multipliers for the multipliers 63 and 64 to adjust the amplitudes of the modulation signals.

In the embodiments as described above, calibration of the quadrature phase modulator can be executed by using sine-wave signals which are quadrature in phase and adjusting parameters in the adjusting sections while observing the output frequency spectrum on the spectrum analyzer. The adjustment for correcting the amplitude error, phase error and carrier leakage can be operated independently of one other so as to minimize the frequency spectrum components of the output signals on the spectrum analyzer. As a result, it is unnecessary to repeat the adjustments. The calibration systems do not measure high harmonics so that accurate calibration can be obtained.

Although the present invention is described with reference to preferred embodiments thereof, the present invention is not limited thereto and various modifications or alterations can be easily made therefrom by those skilled in the art without departing from the scope of the present invention as set forth in the appended claims.

What is claimed is:

1. A calibration system for a quadrature phase modulator having a pair of mixers each for mixing a corresponding one of quadrature modulation signals with a corresponding one of quadrature carrier waves and a hybrid block for synthesizing outputs of said mixers, said calibration system comprising:

a spectrum analyzer for monitoring an output frequency spectrum of said hybrid block, said output frequency spectrum including an indication of at least one of an amplitude error and a phase error in an output of said hybrid block;

a signal generator for generating a pair of sine-wave signals;

an adjusting block for adjusting at least one of said sine-wave signals to correct at least one of the amplitude error and the phase error in an output of said quadrature phase modulator as indicated in said output frequency spectrum, said adjusted sine-wave signals being the quadrature modulation signals to said mixers; and wherein said adjusting block includes a first correction circuit which adjusts a first one of said sine-wave signals to correct said amplitude error and a second correction circuit which adjusts a second one of said sine-wave signals to correct said phase error.

2. A calibration system as defined in claim 1 wherein said sine-wave signals before adjustment have a phase difference of 90° therebetween.

3. A calibration system as defined in claim 1 wherein said adjusting block has a DC voltage offset member for adjusting a DC level of said sine-wave signals.

4. A calibration system as defined in claim 1 wherein said signal generator includes a first ROM and a second ROM having data for a sine signal and a cosine signal, respectively.

5. A calibration system as defined in claim 1 wherein said signal generator includes a digital signal processor for supplying digital data for said sine-wave signals and a pair of D/A converters for converting the output of said digital signal processor.

6. A calibration system as defined in claim 1 wherein said adjusting block is integrated to said quadrature phase modulator to form a modulator assembly.

7. A calibration system as defined in claim 6 wherein said signal generator is further integrated to said quadrature phase modulator to form said modulator assembly.

8. A calibration system for a quadrature phase modulator having a pair of mixers each for mixing a corresponding one of quadrature modulation signals with a corresponding one of quadrature carrier waves and a hybrid block for synthesizing outputs of said mixers, said calibration system comprising:

a signal generator for generating a pair of sequential data for representing a pair of sine-waves, an adjusting block for adjusting an amplitude of at least one of said sine-waves when there is an amplitude error in an output of said quadrature phase modulator and a phase of at least one of said sine-waves when there is a phase error in the output of said quadrature phase modulator, to thereby supply a pair of adjusted sequential data, a pair of D/A converters for converting said adjusted data to supply a pair of sine-wave signals as the modulation signals to said mixers, and a spectrum analyszer for monitoring an output frequency spectrum of said hybrid block.

9. A method for calibrating a quadrature phase modulator, including the steps of:

supplying a pair of sine-wave signals and a pair of carrier waves to a pair of mixers of the quadrature phase modulator, respectively, monitoring an output frequency spectrum of the quadrature phase modulator to detect at least one of an amplitude error and a phase error of the quadrature phase modulator, and adjusting an amplitude of at least one of said pair of sine-wave signals when the amplitude error is detected and a phase of at least one of said pair of sine-wave signals when the phase error is detected.

10. A method for calibrating a quadrature phase modulator as defined in claim 9 further including the step of adjusting a DC level of said pair of sine-wave signals.

11. A calibration system as defined in claim 1, wherein, when the output of said quadrature phase modulator includes the amplitude error and the phase error, the amplitude error and the phase error are corrected sequentially by said first correction circuit and said second correction circuit, respectively.

12. A calibration system as defined in claim 11, wherein said first correction circuit and said second correction circuit respectively correct the amplitude error and the phase error in the output of the quadrature phase modulator independently from one another, so that correction of the amplitude error by said first correction circuit does not substantially affect phases of said sine-wave signals and correction of the phase error by said second correction circuit does not substantially affect amplitudes of said sine-wave signals.

13. A calibration system as defined in claim 12, wherein said first correction circuit corrects the amplitude error in the output of the quadrature phase modulator by adjusting only the first one of said sine-wave signals.

14. A calibration system as defined in claim 1, wherein said second correction circuit corrects a phase error between said two sine-wave signals by adjusting only the second one of said sine-wave signals.

15. A calibration system as defined in claim 14, wherein said first correction circuit and said second correction circuit are independently controlled to correct the amplitude error and the phase error, respectively.

16. A calibration system as defined in claim 1, wherein the first correction circuit includes:

a variable-gain amplifier for amplifying the first one of said sine-wave signals; and a first resistance-changing element which changes a gain of said variable-gain amplifier by an amount sufficient to correct the amplitude error in the output of said quadrature phase modulator.

17. A calibration system as defined in claim 1, wherein said second correction circuit includes:

a divider circuit which divides the first one of said sine-wave signals to produce a divided signal;

an adder circuit for adding the divided signal to the second one of said sine-wave signals to correct said phase difference between said sine-wave signals; and a second resistance-changing element which controls said divider circuit to adjust said divided signal by an amount sufficient to correct the phase error between the sine-wave signals when said divided signal is added to the second one of said sine-wave signals.

18. A calibration system as defined in claim 1, further comprising:

a third correction circuit which corrects a carrier leakage of said quadrature phase modulator in a manner independent from correction of the amplitude error and the phase error by the first correction circuit and the second correction circuit.

19. A calibration system as defined in claim 18, wherein said third correction circuit includes:

two DC offset voltage circuits which adjust, respectively, DC levels of said sine-wave signals, and wherein said third correction circuit corrects the carrier leakage of said quadrature phase modulator by adjusting a DC level output from at least one of the DC offset voltage circuits by an amount sufficient to suppress the carrier leakage.

20. A calibration system as defined in claim 19, wherein said spectrum analyzer monitors said output frequency spectrum to provide an indication of said carrier leakage and, further, to provide an indication of a corrected carrier leakage by said third correction circuit.

21. A calibration system as defined in claim 13, wherein said spectrum analyzer provides an indication in said output frequency spectrum of a corrected amplitude error as corrected by said first correction circuit and a corrected phase error as corrected by said second correction circuit.

22. A method for calibrating a quadrature phase modulator, said modulator having two mixers for mixing, respectively, different quadrature modulation signals with respective quadrature carrier waves and a hybrid block for synthesizing outputs of the mixers,, said method comprising steps of:

inputting first and second quadrature modulation signals into said quadrature phase modulator;

monitoring a first output of said quadrature phase modulator as generated based on said first and second quadrature modulation signals;

detecting at least one of an amplitude error and a phase error between said quadrature modulation signals;

adjusting at least one of said quadrature modulation signals to correct said at least one of an amplitude error and a phase error, and when the amplitude error and the phase error are both detected, adjusting a first one of said quadrature modulation signals to correct the amplitude error and adjusting a second one of said quadrature modulation signals to correct the phase error; and monitoring a second output of said quadrature phase modulator as generated based on said at least one of said adjusted quadrature modulation signals to detect that at least one of the amplitude error and the phase error have been corrected.

23. A method as defined in claim 22, wherein said first one of said quadrature modulation signals and said second one of said quadrature modulation signals are independently adjusted in such a manner that correction of the amplitude error does not substantially affect phases of the first and second quadrature modulation signals and correction of the phase error does not substantially affect amplitudes of the first and second quadrature modulation signals.

24. A method as define in claim 22, wherein the first one of said quadrature modulation signals is adjusted by:

passing the first one of said quadrature modulation signals into a variable-gain amplifier; and adjusting a gain of the variable-gain amplifier to correct the amplitude error.

25. A method as defined in claim 22, wherein the second one of said quadrature modulation signals is adjusted by:

passing the second one of said quadrature modulation signals into a fixed-gain amplifier; and adjusting a phase correction circuit, disposed between the variable-gain amplifier and the fixed-gain amplifier, to correct the phase error.

26. A method as defined in claim 25, wherein the step of adjusting said phase correction circuit includes:

dividing the first one of said quadrature modulation signals to produce a divided signal, the first one of said quadrature modulation signals being divided by an amount sufficient to correct the phase error in the output of the quadrature phase modulator; and adding the divided signal to the second one of said quadrature modulation signals to correct the phase error.

27. A method as defined in claim 22, further comprising:

applying DC offset voltages to said quadrature modulation signals, respectively; and adjusting the DC offset voltage of at least one of said quadrature modulation signals to correct a carrier leakage of said quadrature phase modulator in a manner independent from correction of said amplitude error and said phase error.

28. A method as defined in claim 27, further comprising:

monitoring the first output of said quadrature phase modulator to detect said carrier leakage; and monitoring the second output of said quadrature phase modulator to detect that said carrier leakage has been corrected.

* * * * *